(12) United States Patent
Gillett et al.

(10) Patent No.: US 6,354,048 B1
(45) Date of Patent: Mar. 12, 2002

(54) FLEXIBLE MANUFACTURING SYSTEMS APPARATUS AND METHODS

(75) Inventors: David Gillett, Blackburn; Jonathan Dobson, Ormskirk; Ian D McManus, Blackburn, all of (GB)

(73) Assignee: British Aerospace Plc, Farnborough (GB)

( * ) Notice: Subject to any disclaimer, the term of this patent is extended or adjusted under 35 U.S.C. 154(b) by 0 days.

(21) Appl. No.: 09/421,889

(22) Filed: Oct. 21, 1999

Related U.S. Application Data

(63) Continuation of application No. PCT/GB99/02132, filed on Jul. 15, 1999.

(30) Foreign Application Priority Data

Jul. 15, 1998 (GB) .............................................. 9815212

(51) Int. Cl.$^7$ ................................................ E04B 5/00
(52) U.S. Cl. ...................................... 52/220.1; 52/263
(58) Field of Search ............................. 52/220.5, 220.2, 52/263, 126.2, 220.1

(56) References Cited

U.S. PATENT DOCUMENTS

| | | | |
|---|---|---|---|
| 3,468,084 A | * 9/1969 | Vaessen ..................... | 52/263 X |
| 4,074,488 A | * 2/1978 | Ray, III ...................... | 52/263 |
| 4,773,196 A | 9/1988 | Yoshida et al. | |
| 4,883,503 A | * 11/1989 | Fish ............................ | 52/263 |
| 4,905,437 A | 3/1990 | Heather | |
| 4,922,670 A | * 5/1990 | Naka et al. ................ | 52/263 X |
| 5,052,157 A | * 10/1991 | Ducroux et al. .......... | 52/263 X |
| 5,265,386 A | 11/1993 | Mühlethaler | |
| 5,477,649 A | * 12/1995 | Bessert ........................ | 52/263 |
| 5,640,821 A | * 6/1997 | Koch ........................ | 52/263 X |
| 5,675,950 A | * 10/1997 | Schilham ..................... | 52/263 |
| 5,983,582 A | * 11/1999 | Vugrek ........................ | 52/263 |

FOREIGN PATENT DOCUMENTS

| | | |
|---|---|---|
| DE | 158 371 A | 12/1983 |
| EP | 0 440 267 A | 8/1991 |
| EP | 0 493 620 A1 | 7/1992 |
| EP | 0 683 554 A1 | 11/1995 |
| GB | 594219 | 11/1947 |
| GB | 2 094 448 A | 9/1982 |
| GB | 2 140 897 | 12/1984 |

\* cited by examiner

*Primary Examiner*—Jose V. Chen
(74) *Attorney, Agent, or Firm*—Pillsbury Winthrop LLP

(57) ABSTRACT

A flexible assembly cell is made up by providing a regular array of fixed, load supporting pedestals on a concrete sub-floor on a meter matrix throughout the assembly area. Jigs and other assembly equipment required in the area are provided with base fixtures on the same meter matrix and the base fixtures are coupled to the relevant pedestals. The gaps between the pedestals are bridged by rectangular load bearing floor panels to provide a raised floor and to provide an underfloor void for routing of services. Moving a jig would be simply achieved by unplugging the relevant services, relocating the jig to a vacant set of pedestals and reconnecting the services, minimising downtime and recurring costs.

15 Claims, 5 Drawing Sheets

FLEXIBLE MANUFACTURING SYSTEMS APPARATUS AND METHODS

This is a continuation of PCT/GB99/02132 filed Jul. 15, 1999.

This invention relates to flexible manufacturing systems and methods which facilitate reconfiguration or relocation of machinery in an assembly plant or manufacturing facility. In particular, but not exclusively, the invention relates to a flexible infrastructure for a military airframe assembly facility, although it will of course be appreciated that the system and methods will find broad application elsewhere.

A typical conventional aircraft assembly area is very inflexible, with jigs bolted down to the concrete floor and set level before being plumbed into the required services. The base of the jigs and the surrounding area are then boxed-in with plywood to remove trip hazards and to restore a level uncluttered working environment. This means that to move a jig at a later stage, carpenters are required to dismantle the plywood boxing-in, qualified tradesmen are required to disconnect the services, and toolmakers then physically move the jig and level it in its new destination prior to reconnecting the services and re-installing the plywood boxing-in. The cost and disruption entailed in this sequence of events means that only in exceptional cases are major tools ever moved. Significant improvements may be achieved by routing the required services into the assembly area via a network of service trenches and employing quick release couplings which do not require qualified personnel for connection/disconnection. This method does not however deliver total. flexibility as jigs must either straddle the service trenches or some degree of boxing-in of trailing services must be tolerated.

Prior art systems, including U.S. Pat. No. 4,773,196 (Yoshida et al) and U.S. Pat. No. 4,905,437 (Heather), disclose flooring where tiles are supported on support elements with spaces between the support elements being used for fitting cables, etc.

However, the systems disclosed in these patents are light weight and would not be suitable for use in an industrial environment. Furthermore, these systems have no provision for the support elements being adapted to allow a substantial piece of equipment to be fixed thereto and then to be easily removed and relocated to another position on the floor. In these systems, the floor tiles carry a significant proportion of the weight of any associated equipment.

In one aspect of this invention there is provided a flexible manufacturing system for allowing relocation of machinery or equipment in a manufacturing or assembly facility or the like, said flexible manufacturing system comprising:

an array of pedestals attached to a base floor region; and an array of floor panel elements disposed between said pedestals and defining a raised floor area, wherein said pedestals are adapted in their upper regions to cooperate in use with corresponding lower load bearing regions of said machinery or equipment, whereby in use the facility may be reconfigured by moving an item of machinery or equipment supported by one set of said pedestals to a different location to be supported by a different set of said pedestals.

The pedestals are preferably disposed in a regular array, such as rectangular or square. Each of said pedestals preferably defines a datum region for co-operation with a lower load-bearing region of said machinery, and the datum regions are preferably located in a common generally horizontal plane. Each of said datum regions preferably defines a datum surface with an adjacent rebated portion for supporting a portion of an adjacent floor panel element, whereby the datum surface is generally continuous with said floor surface, or just below said floor surface, and protected by a cover. At least some of said pedestals preferably include height adjustment means to allow the height thereof to be adjusted during initial setting of the support means on the base floor region.

Said pedestals may be formed of any suitable material but preferably are formed at least partially of cast iron or an alloy thereof. The void between said base floor region and said floor surface preferably accommodates a plurality of service cables, conduits or the like. Preferably at least some of said cables, conduits or the like include releasable connection means at or adjacent said support elements for co-operating with respective connector means associated with said machinery. The floor panel elements may be formed of any suitable material but may typically comprise a wooden layer and a lower metal cladding layer. The mass of the machinery or equipment may be supported substantially wholly by the pedestals.

In another aspect of this invention there is provided a floor support system comprising:

an array of pedestals attached to a base floor region; and an array of floor panel elements disposed between said pedestals and defining a raised floor area, wherein said pedestals are adapted in their upper regions to cooperate in use with the corresponding lower load bearing regions of said machinery or equipment.

Preferably, the support elements are disposed in a regular square array. The equipment used may have lower load bearing regions including plug-in base parts to fit into the upper regions of the pedestals. The mass of the machinery or equipment may be supported substantially wholly by the pedestals.

Whilst the invention has been described above it extends to any novel combination of the features set out above or in the following description.

The invention may be performed in various ways, and an embodiment thereof will now be described in detail, reference being made to the accompanying drawings, in which.

Figure 1:
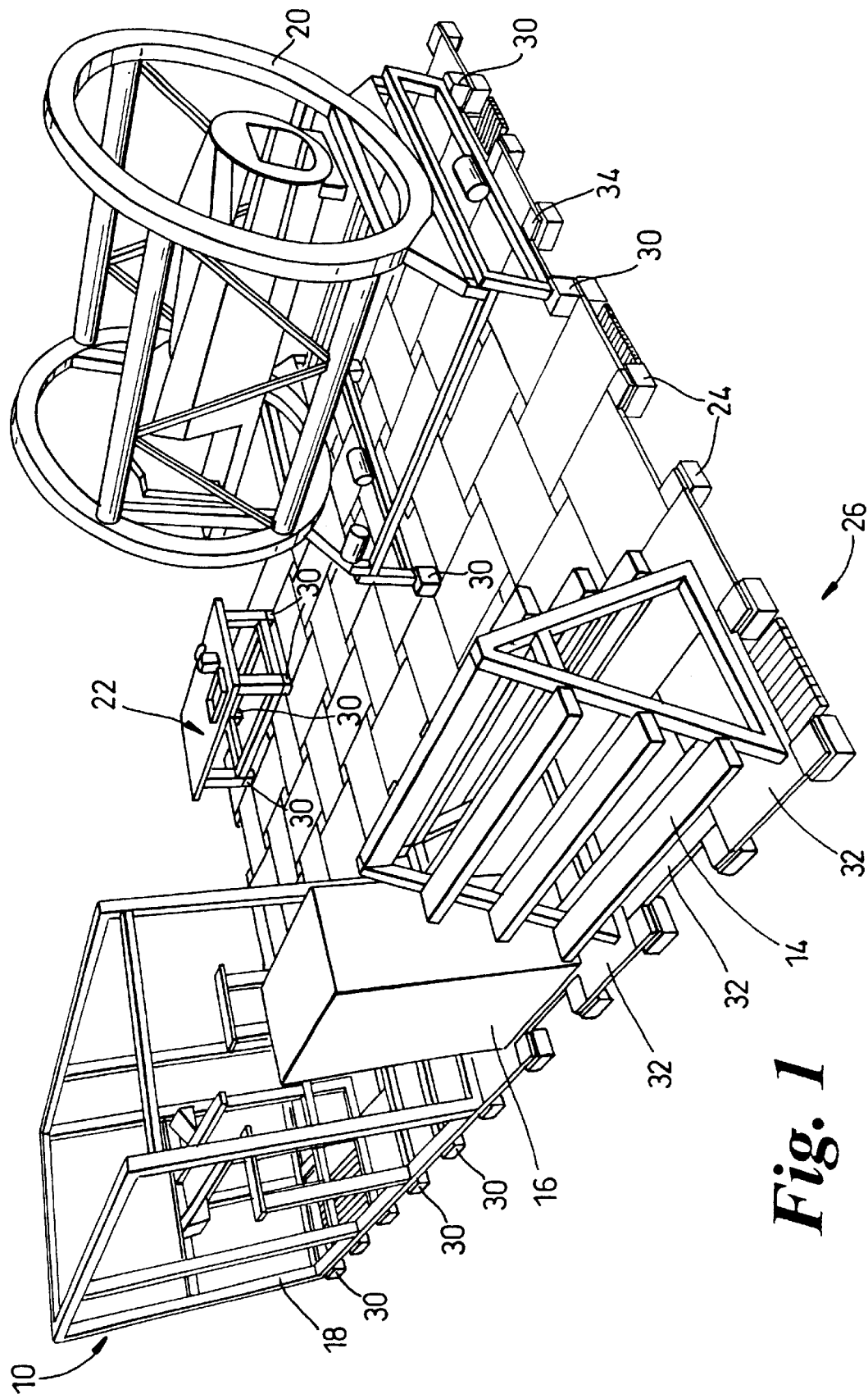
FIG. 1 is a general perspective view of a flexible manufacturing system in accordance with this invention.
Figure 2:
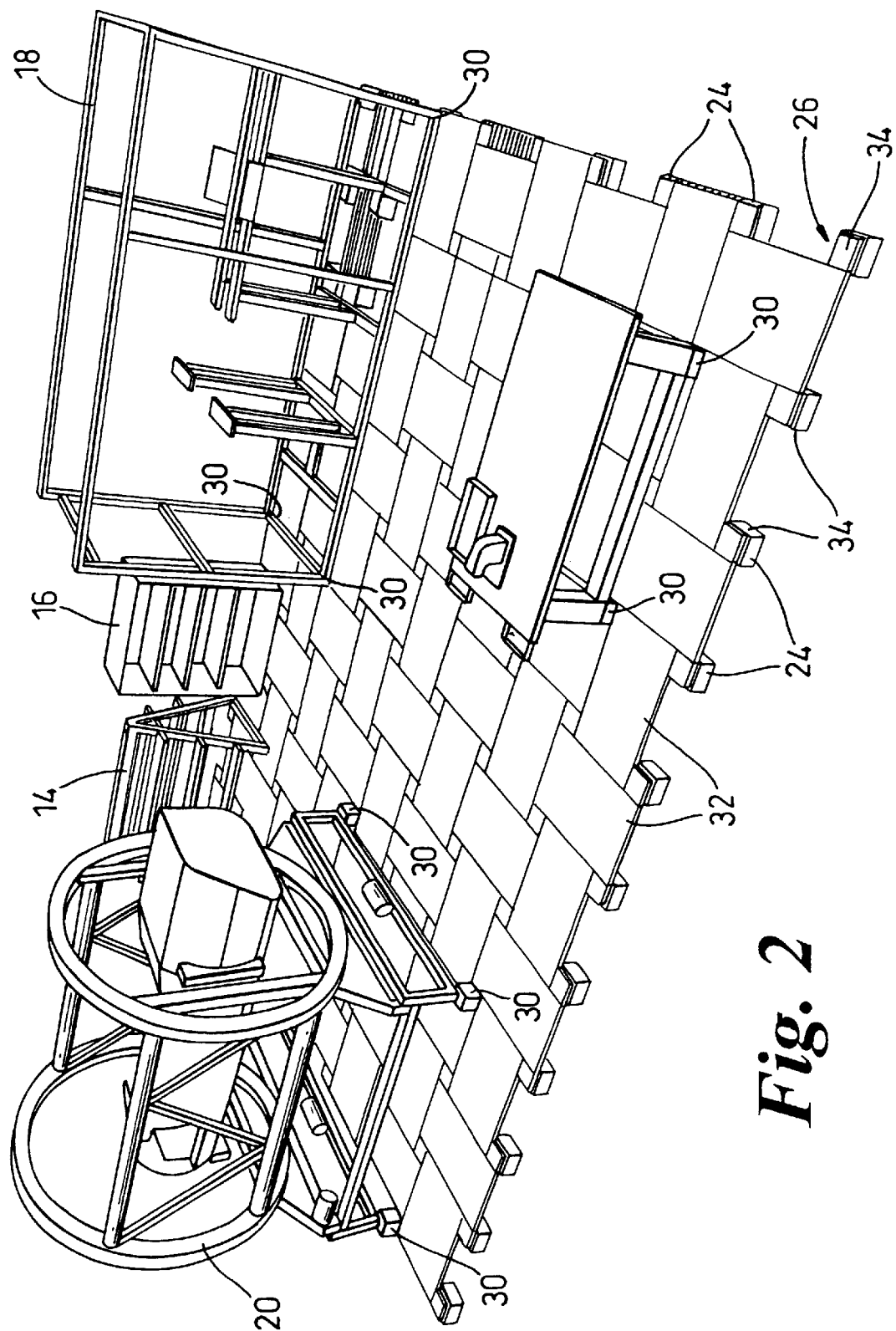
FIG. 2 is another general perspective view of the arrangement of FIG. 1, but from a different angle.
Figure 3:
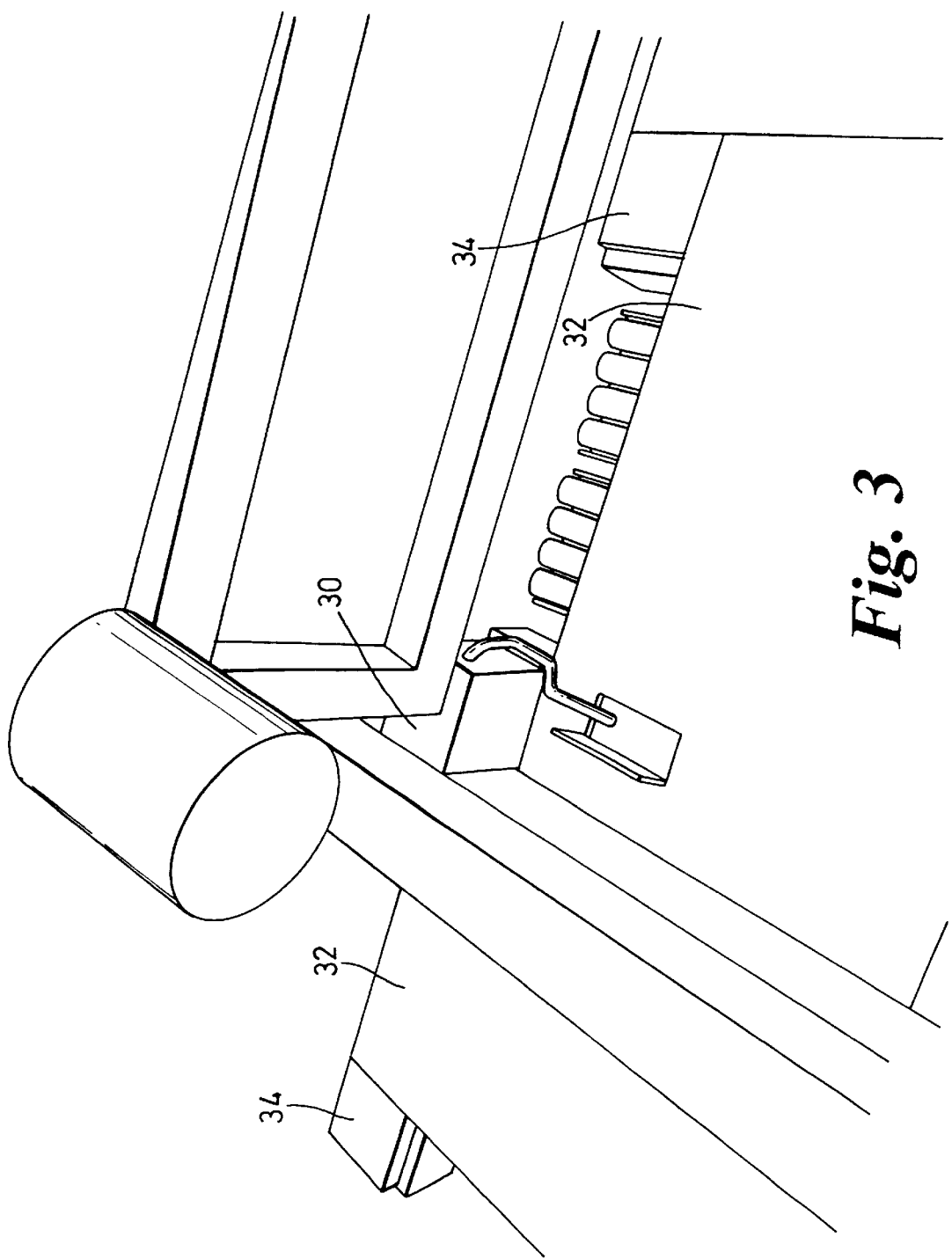
FIG. 3 is general perspective view on a detail of the co-operation between the foot of a jig and the associated pedestal.

The drawings illustrate a flexible cell infrastructure for the assembly of equipment, in this example a military aircraft airframe assembly facility 10. A number of jigs are disposed in the facility 10, namely an A-frame storage unit 14, a shelf unit 16, a manufacturing jig 18, a rotary cradle jig 20 and a work bench 22 set out in a particular configuration. The illustrated facility 10 allows reconfiguration of these jigs 14 to 22 with the minimum of disruption and a considerably reduced need for specialist personnel.

The arrangement comprises a regular square array of substantial cast iron pedestals 24 rigidly bolted to a concrete sub-floor 26 on a 1 m×1 m matrix throughout the assembly area onto which the jigs and other assembly equipment 14 to 22 are mounted. Spaces on the sub floor 26 between the pedestals 24 may function as flood services, and drainage passages may be provided in the surface of the sub floor 26. Service connection points may be provided to the equipment supported by the pedestals 24. The services provided may include electrical supply (415 and 240 volts), compressed air, information technology/communication services and dust extraction. The top surfaces of the pedestals 24 are machined to provide a precise location for the foot 30 of the jig 14 to 22. The area between the pedestals 24 is covered by an array of rectangular floor panel elements or tiles 32 alternately orthogonally arranged. In a typical example, with pedestals spaced at a 1 m×1 m rectangular spacing, the floor tiles may be 0.8 m×1.2 m. Each pedestal which is not supporting the foot of a jig is provided with a pedestal top protector 34 whose upper surface is level with those of the floor tiles to provide a flat surface.

Thus, the arrangement shown in the Figures may be considered to provide a standardised manufacturing facility, wherein bases of equipment (eg. jig 18, workbench 22) are adapted to be supported above the sub floor 26 on the pedestals 24. The bases of the equipment are arranged so that they fit onto one or more of the pedestals arranged in the 1 m×1 m matrix, so that the equipment is supported by the pedestals at a desired location. The weight of the equipment is supported principally by the pedestals upon which it is fitted. The equipment used in the manufacturing facility may be existing equipment adapted to have lower load bearing regions including base parts to fit into the upper regions of the pedestals. Alternatively, the equipment may be standard cell equipment specially designed for use in the manufacturing system of the preferred embodiment.

Figure 4:
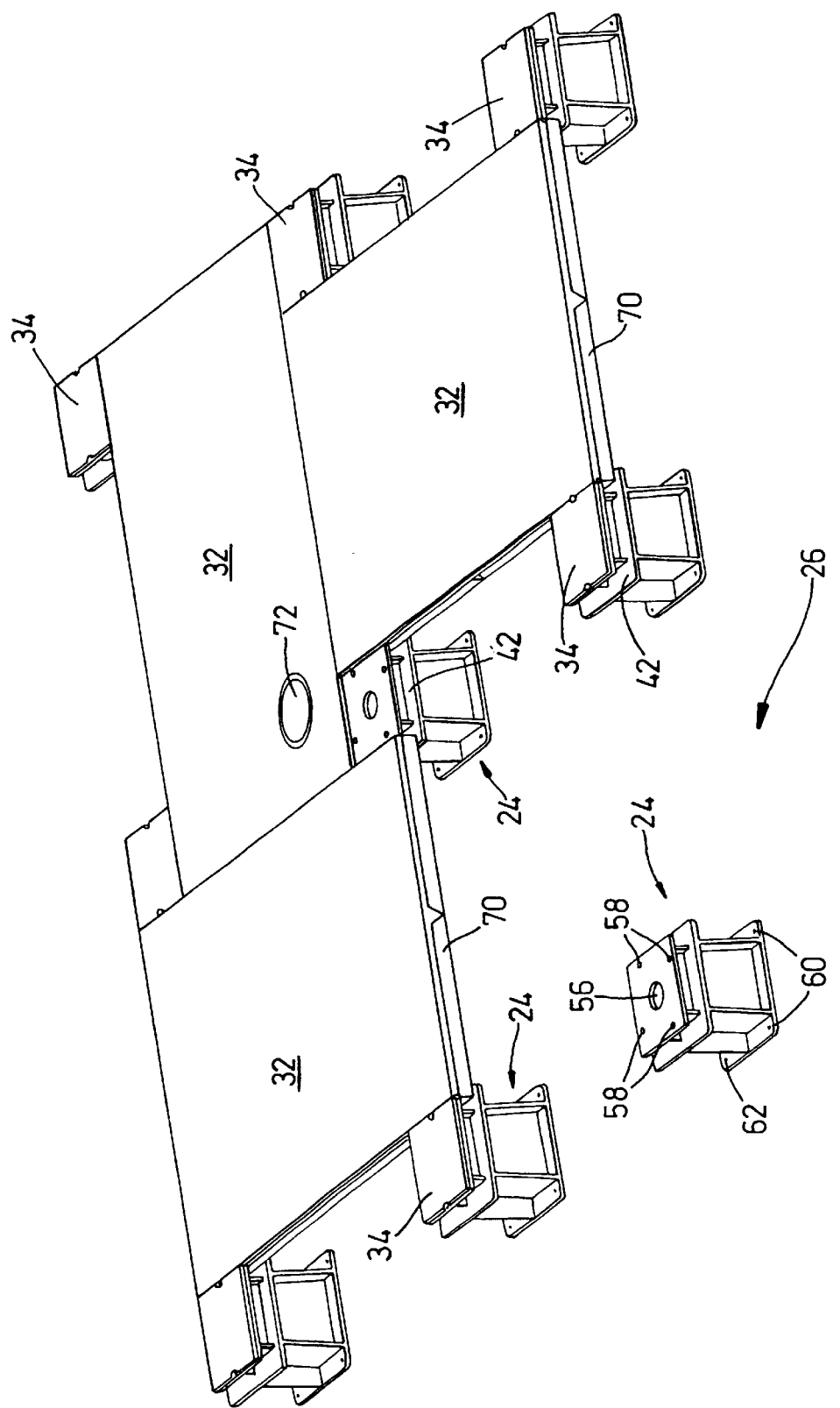
FIG. 4 is a detailed perspective view of an array of pedestals and floor tiles of an embodiment of the flexible manufacturing system of this invention.
Figure 5:
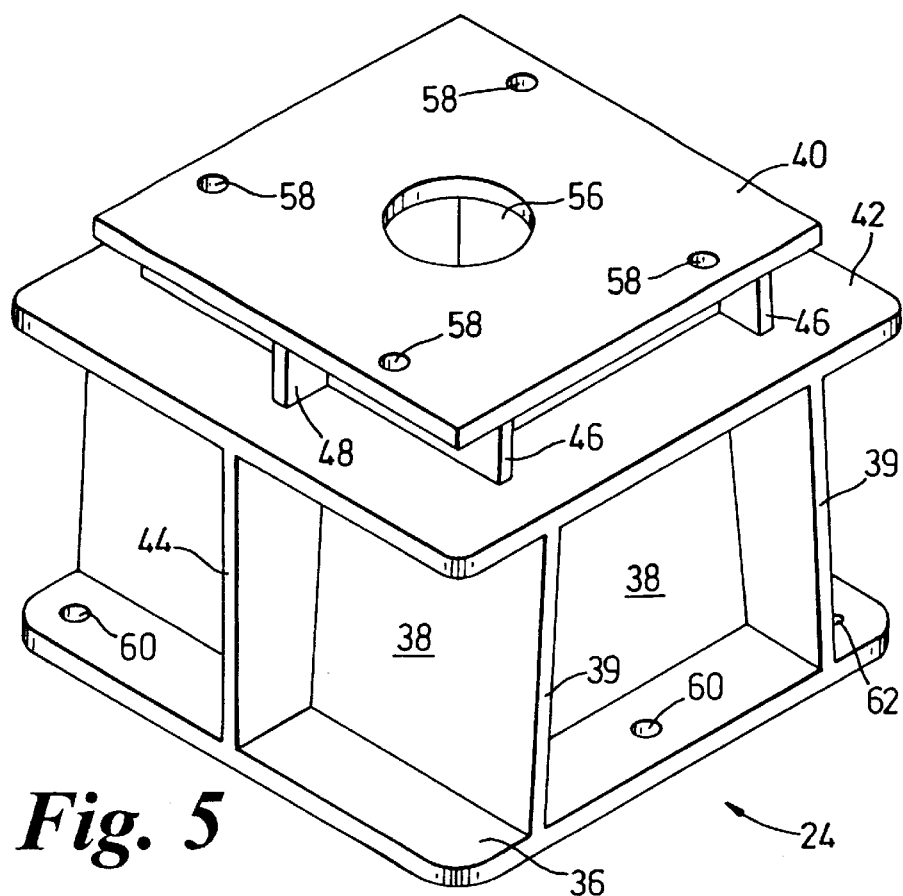
FIG. 5 is a general perspective view of a pedestal of the form shown in FIG. 4.
Figure 6:
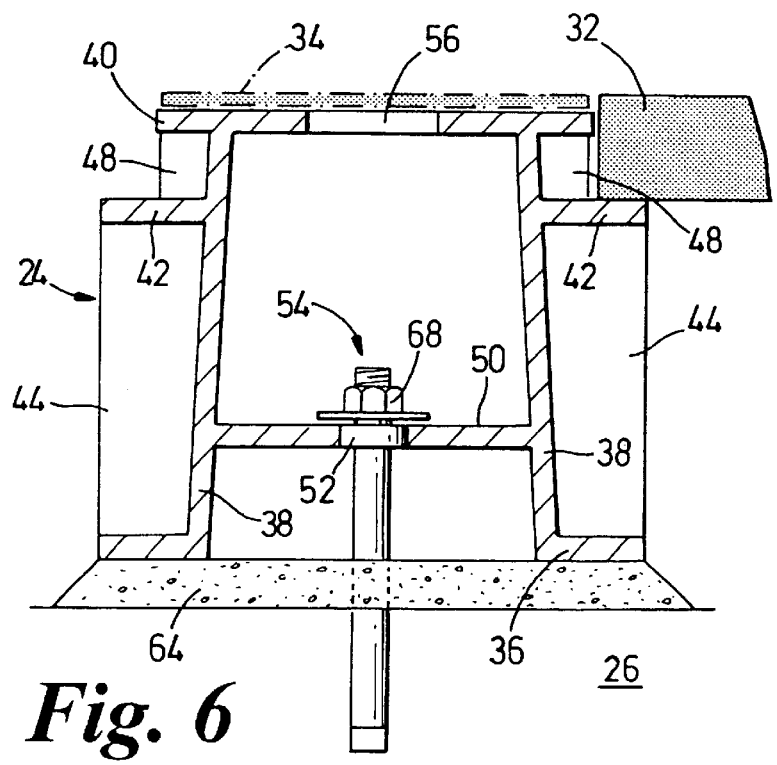
FIG. 6 is a cross-section view through the pedestal shown in FIG. 5.

Referring now to FIGS. 4 to 6, the construction of the pedestals and the floor tiles will be described in more detail. In FIG. 5 and 6, the pedestal 24 comprises a machined casting with a generally square base flange 36, four upstanding wall portions 38, a top plate 40 and a square peripheral support plate 42. As seen more clearly in FIG. 5, two pairs of the wall portions 38 project right to the edge of the base flange 36 to provide stiffening wall extensions 39, and part way along each of the other sides of the base there is a web portion 44. Likewise between the top plate 40 and the peripheral support plate 42 are provided web extensions 46 and web portions 48.

Towards the lower part of the wall portions 38 is provided a horizontal anchorage plate 50 having an aperture 52 for receiving a fixing 54. The top plate 40 has a machined central bore 56 to facilitate alignment during installation, and to allow access to the head of the fixing 54. The top plate 40 defines a datum face and also includes a pattern of threaded holes 58 to facilitate bolting down of assembly tooling and other equipment, as seen in FIG. 5. The base flange 36 includes a number of threaded bores 60 which may incorporate jacking bolts (not shown) to facilitate initial alignment and subsequent adjustment as required, and an earthing hole 62.

In use, a concrete sub-floor 26 is prepared in the assembly area, of suitable depth to receive anchorage bolts, and flat to within accepted tolerances. Pedestals 24 are then located at 1 m centres in a square array over the sub-floor. Each pedestal 24 is located on a layer of cementitous non-shrink grout 64 and adjusted to level it and bring the top plate 40 to the correct height with the other pedestals, using the jacking bolts (not shown) in the bores 60. The pedestal 24 is secured to the sub-floor 26 by means of the fixing 54, which here is a stud chemically anchored in the sub-floor 26 and threaded at its upper end to receive a nut 68 which clamps the anchorage plate 50. The grout 64 is then allowed to cure so that the pedestal is securely bedded and anchored.

Referring to FIG. 4, the floor panels 32 are laid in an orthogonal pattern as shown. Each floor panel 32 may comprise a timber panel, e.g. a bonded birch plywood, with a galvanised steel undertray 70 to prevent the spread of fire. Along each long side of the floor panel 32 is a dust or smoke seal. Certain of the floor panels may be provided with a cable/pipe management socket 72 recessed into the floor tile.

The surface of the tile may be textured to provide a non-slip surface. Each undertray 70 is rectangular with upstanding walls and a v-shape cut out of each of the sides to allow limited flexing. The floor panels 32 are laid on the edges of the peripheral support plates 42 as seen in detail in FIG. 6, and a pedestal top protector 34 applied where required.

In addition to the pedestals 24, the sub-floor 26 may also include spaced firebreaks for example in the form of breeze block firebreak walls.

What is claimed is:

1. A manufacturing system, comprising:
   equipment, said equipment including at least one of a manufacturing jig, a shelf unit, a frame storage unit, a rotary cradle jig, and a work bench; and
   a floor support system, said floor support system comprising:
   an array of pedestals attached to a base floor region; and
   an array of floor panel elements disposed between said pedestals and defining a raised floor area, wherein said pedestals include upper regions that cooperate with corresponding lower load bearing regions of said equipment, and the system may be reconfigured by moving an item of equipment supported by one set of said pedestals to a different location to be supported by a different set of said pedestals.

2. A manufacturing system according to claim 1, wherein said pedestals are disposed in a regular array.

3. A manufacturing system according to claim 2, wherein said pedestals are disposed in a rectangular or square array.

4. A manufacturing system according to claim 1, wherein each of said pedestals defines a datum region that cooperates with the lower load-bearing region of said equipment, the datum regions being located in a common generally horizontal plane.

5. A manufacturing system according to claim 4, wherein each of said datum regions defines a datum surface with an adjacent rebated portion for supporting said floor panel elements, whereby the datum surface is generally continuous with, or spaced below said raised floor area.

6. A manufacturing system according to claim 1, wherein the equipment lower load bearing regions include base parts that engage the upper regions of the pedestals.

7. A manufacturing system according to claim 1, wherein at least some of said pedestals include height adjustment means to allow the height thereof to be adjusted.

8. A manufacturing system according to claim 1, wherein said pedestals are formed at least partially of cast iron or an alloy thereof.

9. A manufacturing system according to claim 1, wherein a plurality of service cables or conduits extend in a void region above said base floor region.

10. A manufacturing system according to claim 9, wherein at least some of said cables or conduits include releasable connection means at or adjacent said pedestals for co-operating with respective connector means associated with said equipment.

11. A manufacturing system according to claim 1, wherein said floor panel elements comprise a wooden layer and a metal cladding layer.

12. A manufacturing system according to claim 1, wherein the mass of the equipment is supported substantially wholly by the pedestals.

13. A manufacturing system, comprising:

at least one item of equipment; and a floor support system including a plurality of pedestals attached to a base floor region and a plurality of floor panel elements disposed between the pedestals and defining a raised floor area, wherein the pedestals include upper regions that cooperate with at least one corresponding load bearing region of the at least one item of equipment, and the system may be reconfigured by moving the at least one item of equipment supported by at least one pedestal to a different pedestal.

14. A manufacturing system according to claim 13, wherein each load bearing region includes at least one foot corresponding to at least one pedestal, and the upper region of each pedestal defines a datum region that cooperates with the at least one foot to support the at least one item of equipment.

15. A manufacturing system according to claim 14, wherein at least one pedestal includes height adjustment means to allow the height thereof to be adjusted.

* * * * *